United States Patent
Sim et al.

(10) Patent No.: US 7,215,328 B2
(45) Date of Patent: May 8, 2007

(54) MULTIMEDIA KEYBOARD

(75) Inventors: Wong Hoo Sim, Singapore (SG); Kok-Liang Lim, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 10/918,883

(22) Filed: Aug. 16, 2004

(65) Prior Publication Data

US 2005/0030283 A1    Feb. 10, 2005

Related U.S. Application Data

(63) Continuation of application No. 10/009,786, filed as application No. PCT/SG01/00040 on Mar. 20, 2001, now Pat. No. 6,842,168.

(30) Foreign Application Priority Data

Mar. 20, 2000  (SG)  ................................ 200001593

(51) Int. Cl.
*H03K 17/94*  (2006.01)

(52) U.S. Cl. .......................... 345/168; 84/129; 84/423; 84/600; 84/744; 361/680

(58) Field of Classification Search ................ 345/157, 345/168, 169; 84/79, 423, 600, 622, 659, 84/744, 745; 341/22, 33; 361/680
See application file for complete search history.

(56) References Cited

U.S. PATENT DOCUMENTS

| 4,653,375 | A | * | 3/1987 | Honda et al. | .................. 84/637 |
| 5,281,958 | A | * | 1/1994 | Ashmun et al. | ............ 345/157 |
| 5,340,941 | A | * | 8/1994 | Okamoto et al. | ............. 84/658 |
| 5,565,641 | A | * | 10/1996 | Gruenbaum | .................. 84/615 |
| 5,646,648 | A | * | 7/1997 | Bertram | ....................... 345/168 |
| 5,726,374 | A | * | 3/1998 | Vandervoort | ................. 84/638 |
| 5,762,250 | A | * | 6/1998 | Carlton et al. | .............. 224/579 |
| 5,892,499 | A | * | 4/1999 | Vulk, Jr. | ...................... 345/156 |
| 6,063,994 | A | * | 5/2000 | Kew et al. | .................... 84/600 |
| 6,262,716 | B1 | * | 7/2001 | Raasch | ........................ 345/168 |
| 6,351,225 | B1 | * | 2/2002 | Moreno | ........................ 341/22 |

OTHER PUBLICATIONS

John Douglas Byant; Virtual multimedia system; Jan. 29, 1992; GB 2 246 456.*

* cited by examiner

*Primary Examiner*—Amr A. Awad
*Assistant Examiner*—Vincent E. Kovalick
(74) *Attorney, Agent, or Firm*—Russell N. Swerdon

(57) ABSTRACT

A multimedia console incorporating an alphanumeric keyboard, and a musical key-bed is described for generating multimedia work product conveniently when coupled with a digital personal computer or optionally as a stand alone music equipment. The musical key-bed is optionally detachably coupled with a protective cover for providing ergonomic support when said musical key-bed is not being used.

10 Claims, 3 Drawing Sheets

MULTIMEDIA KEYBOARD

RELATED APPLICATION DATA

This is a continuation of U.S. patent application Ser. No. 10/009,786 filed Nov. 5, 2001 now U.S. Pat. No. 6,842,168, which is a 35 USC § 371 national phase entry of PCT Patent Application No. PCT/SG01/00040 filed Mar. 20, 2001, which in turn claims priority to Singapore patent application No. 2000015933 filed Mar. 20, 2000, the disclosures of all of which are incorporated by reference in their entirety.

FIELD OF THE INVENTION

The present invention relates to an input device for generating multimedia information with digital processor. In particular, the present invention pertains to a versatile accessory for providing input information to digital processor and music equipment for generating multimedia work product.

BACKGROUND OF THE INVENTION

Input devices such the keyboard and mouse are well known in the personal computer industry for providing text and command to the digital computer for generating multimedia work products. Although the industry initially marketed such input devices as discrete accessories, the advent of the internet and the requirement for multimedia information have prompted input device manufacturers to extend the capability of stand alone input devices to cater to the needs of authors of multimedia work products.

At the same time, the music industry evolved from a mainly analogue world to a digital one: music synthesizers and music composition programs contributed significantly to the origination of musical output from the music industry. The popularity and acceptance of internet no doubt hastens this process.

SUMMARY OF THE INVENTION

A multimedia console incorporating an alphanumeric keyboard and a musical keybed is described for generating multimedia work product conveniently when coupled with a digital personal computer or optionally as a stand alone music equipment. When the musical key-bed functionality is not required, a palm rest cover converts the top surface area of the musical key-bed into an ergonomic support for the user's hands. In a second embodiment, a string instrument module encourages users of personal computers and music instrument players alike to generate original multimedia work products effectively and economically.

DETAILED DESCRIPTION OF THE INVENTION

Figure 1:
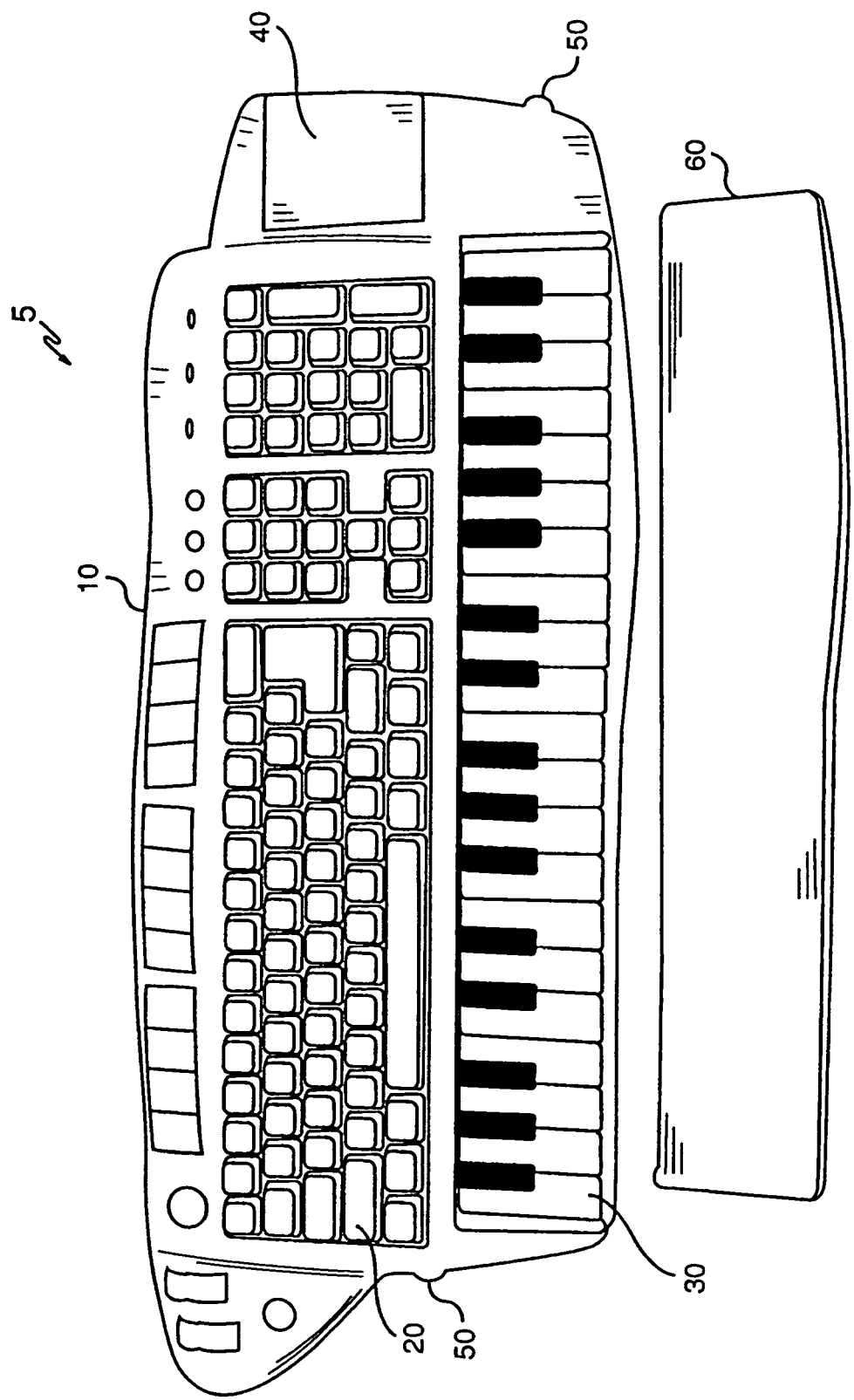
FIG. 1 is a top, plan, elevational view of a first embodiment of the present invention with the palm rest cover being removed and exposing the top surface of the musical key-bed.

FIG. 1 is a top, plan, elevational view of applicant's multimedia console as described in Singapore patent application number 20001593-3 filed on 20 Mar. 2000. A multimedia console 5 comprises a housing 10 for receiving a keyboard 20, a musical key-bed 30, a pointing device 40 and a protective cover 60. In the preferred embodiment, the keyboard 20 is an extended QWERTY keyboard that features a full alphanumeric key set and function key set. Disposed substantially parallel with and below the keyboard 20 is the musical key-bed 30 which is integrated with the console 5. The pointing device 40 can either be a touch pad or a mouse for directing the cursor on an onboard display (not shown in figures) or optionally on a display screen of a digital personal computer (also not shown in figures).

When the musical key-bed 30 is not used, the user may place the protective cover 60 over the length of the musical key-bed 30. This cover 60 not only serves to as a palm rest for the key-bed 30, but also provides the user with the ergonomic benefits of such a protective cover. It should be understood by one skilled in the art that prolong and uninterrupted use of the keyboard 20 may cause psychological changes to the user's fingers and palms.

Referring again to FIG. 1, the-pointing device 25 is also integrated as part of the multimedia console. Here, the distance between the alphanumeric key pads of the keyboard 20 and the pointing device 40 is kept at a minimum. As such, the user can control the process of composition of multimedia work product optimally. It should be understood by one skilled in the art that the pointing device can be either a mouse, touch pad or equivalent accessory for controlling the direction and command of a cursor on a display screen (not shown).

Referring again to FIG. 1, a plurality of jacks 50 are disposed strategically on the side of housing 10 for securing thereon a strap (not shown). Such a strap facilitates a musician or user in carrying the multimedia console on his or her shoulders in generating musical signals with the musical key-bed.

Not shown but understood by one skilled in the arts is a link (not shown in figures) between the multimedia console 5 and the processor unit (not shown figures). As mentioned briefly above, the processor can be a digital signal processor or a dedicated processor or an embedded chip. The link can be internal or can be a cable based on existing industry standards such as PS2 or Universal Serial Bus (USB) in combination with MIDI. In other instances, the multimedia console of the present invention can have a wireless link such as infrared or radio frequency.

With the multimedia console 5, authors and creators of multimedia content or even everyday user of personal computer can generate multimedia work product such as new web application on the spot without relying on traditionally dedicated equipment. As such, the cycle time for the origination of multimedia work product can be reduced tremendously. The multimedia console 5 of the present invention comes with the flexibility of disabling the musical key-bed 30 with a toggle switch (not shown). Alternatively, the protective cover 60 is detachably laid over the top surface of the key-bed 30 when the key-bed 30 is not required. The protective cover 60 also provides ergonomic support for the user.

While the multimedia console 5 is an adequate accompaniment for the origination of multimedia work product, the range of musical instruments represented is limited. For instance, the musical key-bed 30 simulates the input strokes of a piano or organ player. However, string instruments such as guitar or banjo is difficult to emulate with the multimedia console 5.

Figure 2:
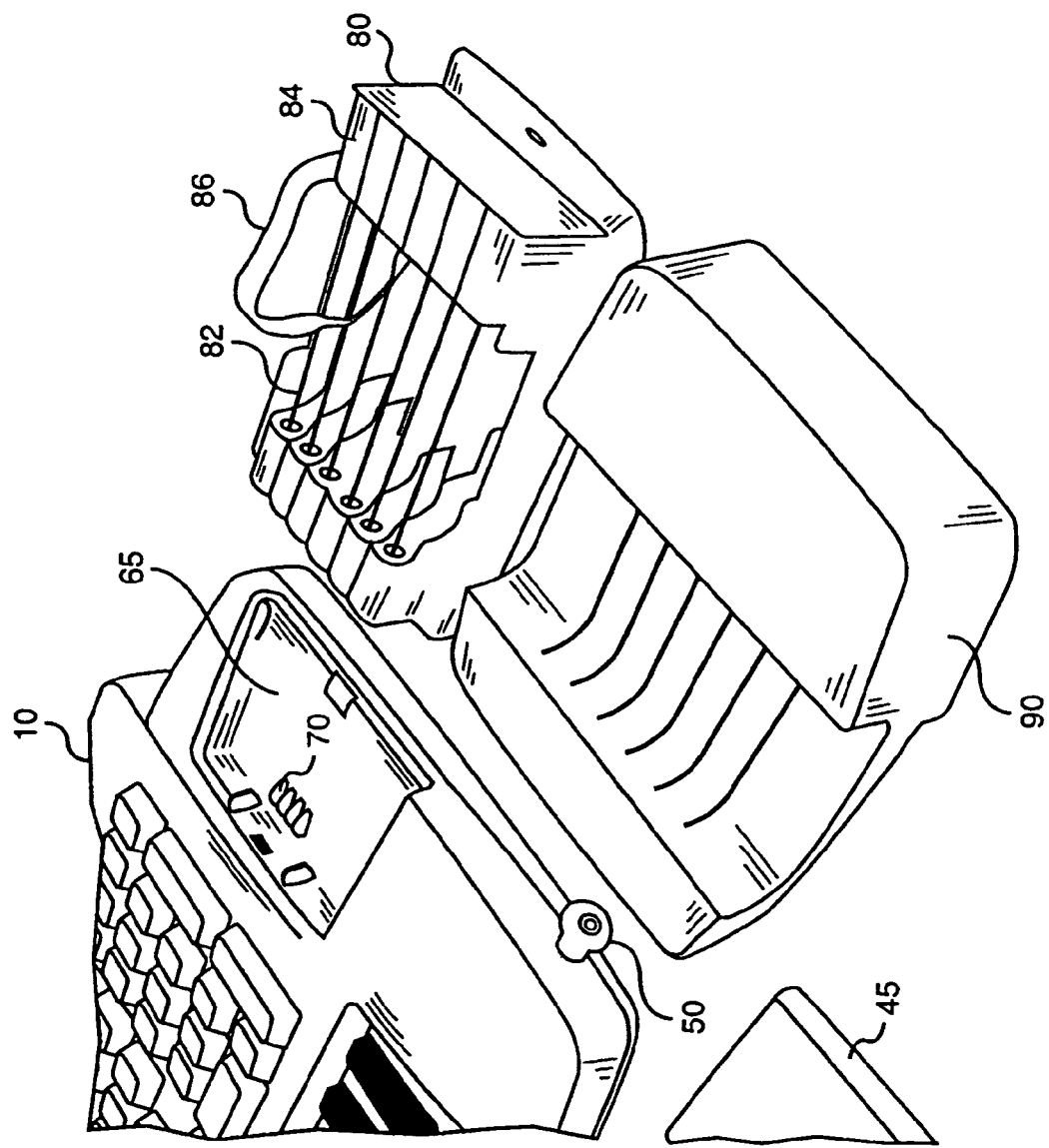
FIG. 2 is a right side, partial elevation view of a second embodiment of the present invention including a string instrument module before it is coupled with the multimedia console.

FIG. 2 is a right side, partial elevation view of the embodiment of the present invention highlighting the string instrument module before it is coupled with the multimedia console. The string instrument module comprises an accessory module 80 and a housing 90 that is detachably coupled to an interface receptable 65 that is previously occupied by the pointing device of Applicants' Singapore patent application number 20001593-3. Instead of the pointing device, the space is taken by a cover 45 and the interface receptable 65. Disposed within the interface receptacle 65 is at least one electrical interface for the accessory module 80.

Again in FIG. 2, the accessory module 80 further comprises a plurality of strings 82 that are arranged substantially parallel with each other. The vibration of strings is sent to an analog-to-digital converter 84 (not shown in the figure but understood to be embedded in the module or within the body 10). The electrical signals from the accessory module 80 are transmitted via wires 86 to the console via the electrical interface 70. The accessory housing 90 is capped over the accessory module 80 before the entire assembly is coupled to the interface receptacle 65 on the console.

Figure 3:
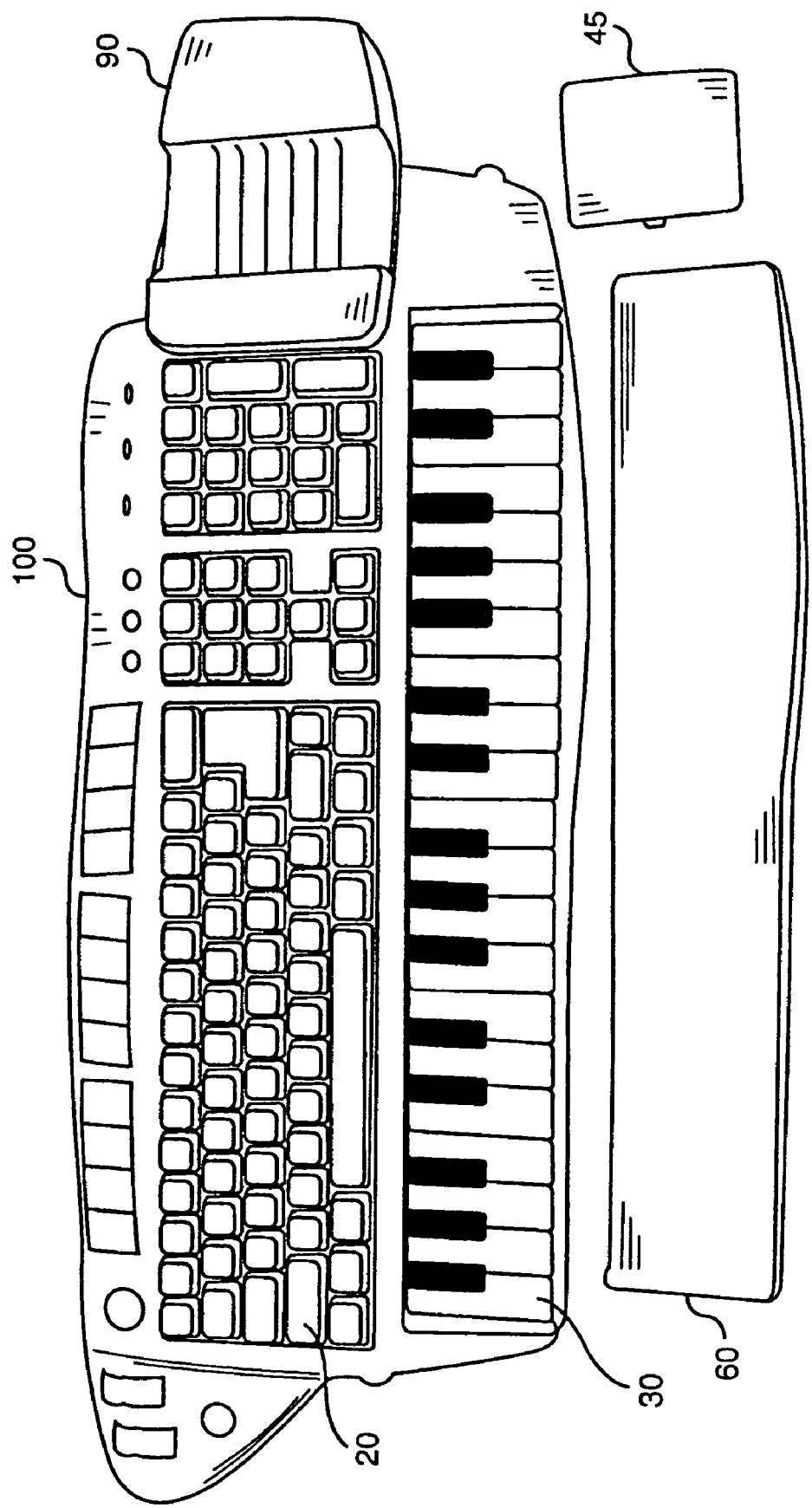
FIG. 3 is top, plan, elevational view of the multimedia console of FIG. 2 showing the string instrument module being coupled thereto.

FIG. 3 is top, plan, elevational view of the improved multimedia console 100 of the present invention showing the string instrument housing 90 being coupled thereto. The string instrument housing 90 is located within the easy reach of the user such that the strings 82 can be plucked just as any guitarist or banjo player. Of course, the accessory cover 45 has to be removed from the interface receptacle 65 before the accessory housing 90 can be coupled with the improved multimedia console.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

What is claimed is:

1. An enlarged computer keyboard for coupling to a digital computer comprising:
   a housing;
   a first arrangement of alphanumeric keys located in a first face of the housing for entering text into the digital computer; and
   a separate bank of single function musical keys located in front of the alphanumeric keys in the first face and configured for generating musical notes, wherein the dimensions of the housing substantially conform to a form factor for a standard alphanumeric computer keyboard except for an extended dimension of the first face to accommodate the separate bank.

2. The computer keyboard as recited in claim 1 further comprising a user selectable switching circuit configured to selectively disable the separate bank of single function music keys located in the front portion of the keyboard to accommodate typing on the arrangement of alphanumeric keys.

3. The keyboard as recited in claim 1 wherein the separate bank includes conventionally shaped black piano keys interspersed in conventional piano keyboard layout positions among conventionally shaped white piano keys, the white and black keys having conventional relative sizes as to each other.

4. The computer keyboard as recited in claim 1 wherein the extended dimension lies from the front to the back of the computer keyboard.

5. The computer keyboard as recited in claim 1 further comprising a full function key set in proximity to the arrangement of alphanumeric keys.

6. The computer keyboard as recited in claim 5 wherein the arrangement comprises an extended QWERTY keyboard layout.

7. A computer keyboard configured for entering both alphanumeric characters and musical notes comprising:
   a housing substantially conforming to a form factor for standard computer keyboards except for an inclusion of an extension of the housing at the front of the keyboard;
   an alphanumeric key layout; and
   a separate bank of single function musical keys arranged in a standard piano keyboard layout and dedicated to the generation of musical notes, wherein the separate bank is located to the front of the alphanumeric key layout and integrated into the housing with the alphanumeric key layout.

8. The keyboard as recited in claim 7 wherein the separate bank includes conventionally shaped black piano keys interspersed among conventionally shaped black piano keys in conventional piano keyboard layout positions, the white and black keys having conventional relative sizes as to each other.

9. The keyboard as recited in claim 8 wherein the alphanumeric key layout is an extended QWERTY layout having function keys with conventional shapes and positions.

10. The keyboard as recited in claim 8 further comprising a user selectable switching circuit configured to selectively disable the separate bank of single function music keys located in the front portion of the keyboard to accommodate typing on the alphanumeric key layout.

* * * * *